United States Patent
Sethumadhavan et al.

(10) Patent No.: US 8,112,664 B2
(45) Date of Patent: Feb. 7, 2012

(54) USING VOLUME SNAPSHOTS TO PREVENT FILE CORRUPTION IN FAILED RESTORE OPERATIONS

(75) Inventors: Suren Sethumadhavan, Lake Mary, FL (US); Ynn-Pyng "Anker" Tsaur, Oviedo, FL (US)

(73) Assignee: Symantec Operating Corporation, Mountain View, CA (US)

( * ) Notice: Subject to any disclaimer, the term of this patent is extended or adjusted under 35 U.S.C. 154(b) by 406 days.

(21) Appl. No.: 12/055,436

(22) Filed: Mar. 26, 2008

(65) Prior Publication Data

US 2009/0249119 A1    Oct. 1, 2009

(51) Int. Cl.
*G06F 11/00* (2006.01)
(52) U.S. Cl. .................. 714/15; 714/2; 714/42; 714/6.1
(58) Field of Classification Search .................... 714/15, 714/2, 6.1, 42
See application file for complete search history.

(56) References Cited

U.S. PATENT DOCUMENTS

| | | | |
|---|---|---|---|
| 6,832,330 B1 * | 12/2004 | Boudrie et al. | 714/6 |
| 7,231,544 B2 * | 6/2007 | Tan et al. | 714/15 |
| 7,254,682 B1 | 8/2007 | Arbon | |
| 7,617,414 B2 | 11/2009 | Becker | |
| 7,620,785 B1 | 11/2009 | Coulter | |
| 7,660,832 B2 * | 2/2010 | Nomoto et al. | 711/162 |
| 7,694,088 B1 | 4/2010 | Bromley | |
| 7,716,185 B2 * | 5/2010 | Thompson et al. | 707/640 |
| 2001/0043973 A1 * | 11/2001 | Keck et al. | 426/138 |
| 2003/0126247 A1 * | 7/2003 | Strasser et al. | 709/223 |
| 2006/0129886 A1 * | 6/2006 | Ohno et al. | 714/15 |
| 2007/0106857 A1 * | 5/2007 | Koning et al. | 711/162 |
| 2007/0294320 A1 * | 12/2007 | Yueh et al. | 707/204 |
| 2008/0244307 A1 * | 10/2008 | Dasari et al. | 714/4 |

* cited by examiner

*Primary Examiner* — Scott Baderman
*Assistant Examiner* — Sarai Butler
(74) *Attorney, Agent, or Firm* — Meyertons, Hood, Kivlin, Kowert & Goetzel, P.C.

(57) ABSTRACT

Restore software executing in a computer system may invoke a snapshot of a target volume before restoring a plurality of files from a backup image to the target volume. If the restore operation fails before all the files are restored to the target volume then the restore software may use the snapshot to return one or more of the files to their original states as they existed before the restore operation was initiated.

9 Claims, 5 Drawing Sheets

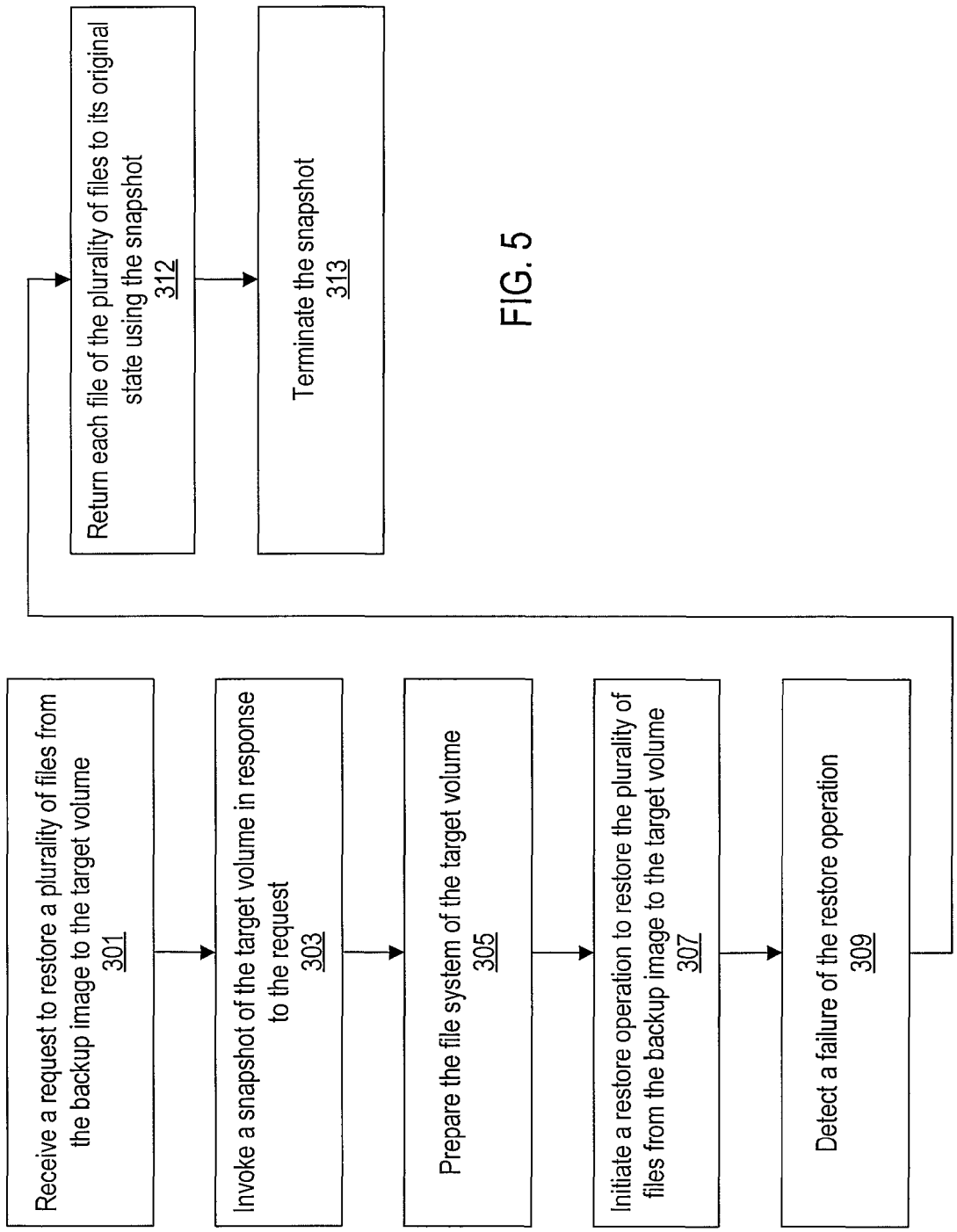

USING VOLUME SNAPSHOTS TO PREVENT FILE CORRUPTION IN FAILED RESTORE OPERATIONS

BACKGROUND OF THE INVENTION

1. Field of the Invention

This invention relates to generally to file backup and restore operations for computer systems. More particularly, the invention relates to a system and method for preventing files from being corrupted when a restore operation fails.

2. Description of the Related Art

Various software tools exist for backing up data files from a computer system and restoring the backed-up files to the computer system. Such tools are provided to permit recovery from user error or hardware failure in the backed-up computer system, or to insure against disaster situations originating outside the computer system that cause data loss by damaging the computer system.

One general backup technique is to backup files in a volume at the file level, e.g., to backup the files on a file-by-file basis. In this technique, all the data for a given file in the volume is typically backed up, followed by all the data for the next file, etc. In a corresponding restore operation, the files may be restored to the volume on a file-by-file basis. For example, all the data for one file may be restored, followed by all the data for the next file, etc.

Another general backup technique is to backup the volume at the storage device block level rather than on a file-by-file basis. In this technique, the blocks of the volume may be sequentially read from the disk drive or other storage device on which the volume is stored and written to a backup image on a backup storage device. Data for a given file may be fragmented on the disk drive, e.g., rather than all the data being stored in contiguous block locations. Since the backup image is effectively an exact block-level image of the original volume, the data for various files may also be fragmented in the backup image such that data for different files are interleaved with each other. If a restore operation fails when restoring multiple files from a block-level backup image, e.g., from a tape drive or other sequential access device, then all of the files that were being restored can end up in a corrupted state since only some of their data blocks may have been successfully restored before the failure.

SUMMARY

Various embodiments of a system and method for restoring files from a backup image to a target volume are described herein. The method may be implemented by restore software executing in a computer system. The restore software may receive a request to restore a plurality of files from the backup image to the target volume. Each of the plurality of files may have an original state in the volume at the time the request is received.

In response to the request, the restore software may invoke a snapshot of the target volume. Invoking the snapshot may establish a point-in-time representation of the target volume, e.g., as it exists at the time the snapshot is invoked. This may enable the selected files to be returned to their original states using the snapshot in the event that a failure occurs during the restore operation, as described below. In some embodiments, invoking the snapshot may comprise creating a copy-on-write snapshot of the target volume. In other embodiments the snapshot may be invoked as a hardware-provided snapshot or other type of snapshot.

The restore software may initiate a restore operation to restore the plurality of files from the backup image to the target volume. The restore operation may operate to copy data for the plurality of files from the backup image to the target volume. Although this causes the data in the target volume to be modified, the unmodified data (e.g., the target volume data as it existed before the restore operation began) still remains available through the snapshot.

Under normal circumstances the restore operation operates to successfully restore each of the plurality of files to the target volume. In this case, it is not necessary to use the snapshot, and the snapshot may simply be terminated or deleted.

However, in some cases the restore operation may fail before all files of the plurality of files are completely restored to the target volume. If the restore operation fails then one or more of the plurality of files that were being restored may be in a corrupt state. For example, if the backup image is a block-level backup image and if the files were being restored block-by-block from the backup image then any file whose complete data had not yet been restored at the time the restore operation failed may be in a corrupt state. As another example, if the backup files are stored in the backup image on a file basis and if the files were being restored on a file-by-file basis then the file that was being restored at the time the restore operation failed may be in a corrupt state.

The restore software may detect the failure of the restore operation. Each of the plurality of files that was not successfully restored during the restore operation is referred to herein as a failed file. In some embodiments, the restore software may return each failed file to its original state using the snapshot. After the failed files have been returned to their original states, the restore software may terminate or delete the snapshot.

In some cases the restore operation may successfully restore a first subset of the plurality of files from the backup image to the volume and may not successfully restore a second subset of the plurality of files from the backup image to the volume. In some embodiments, each file of the second subset of the plurality of files may be returned to its original state in the volume using the snapshot, and no file from the first subset of the plurality of files is returned to its original state. This allows the successfully restored files to remain in their restored states, while preventing the unsuccessfully restored files from being in a corrupted state.

However, in some applications, if some of the plurality of files are in their original states and others are in their restored states then the files may not be consistent with each other, which may lead to problems. Thus, in some embodiments it may be desirable to use the snapshot to return all of the plurality of files to their original states, even if some of them were successfully restored. For example, the restore software may return each file of the plurality of files to its original state using the snapshot.

BRIEF DESCRIPTION OF THE DRAWINGS

A better understanding of the invention can be obtained when the following detailed description is considered in conjunction with the following drawings, in which:

FIGS. 4 and 5 illustrate embodiments of a method for preventing files from being corrupted when a restore operation fails, where the method is performed by the restore software.

Figure 1:
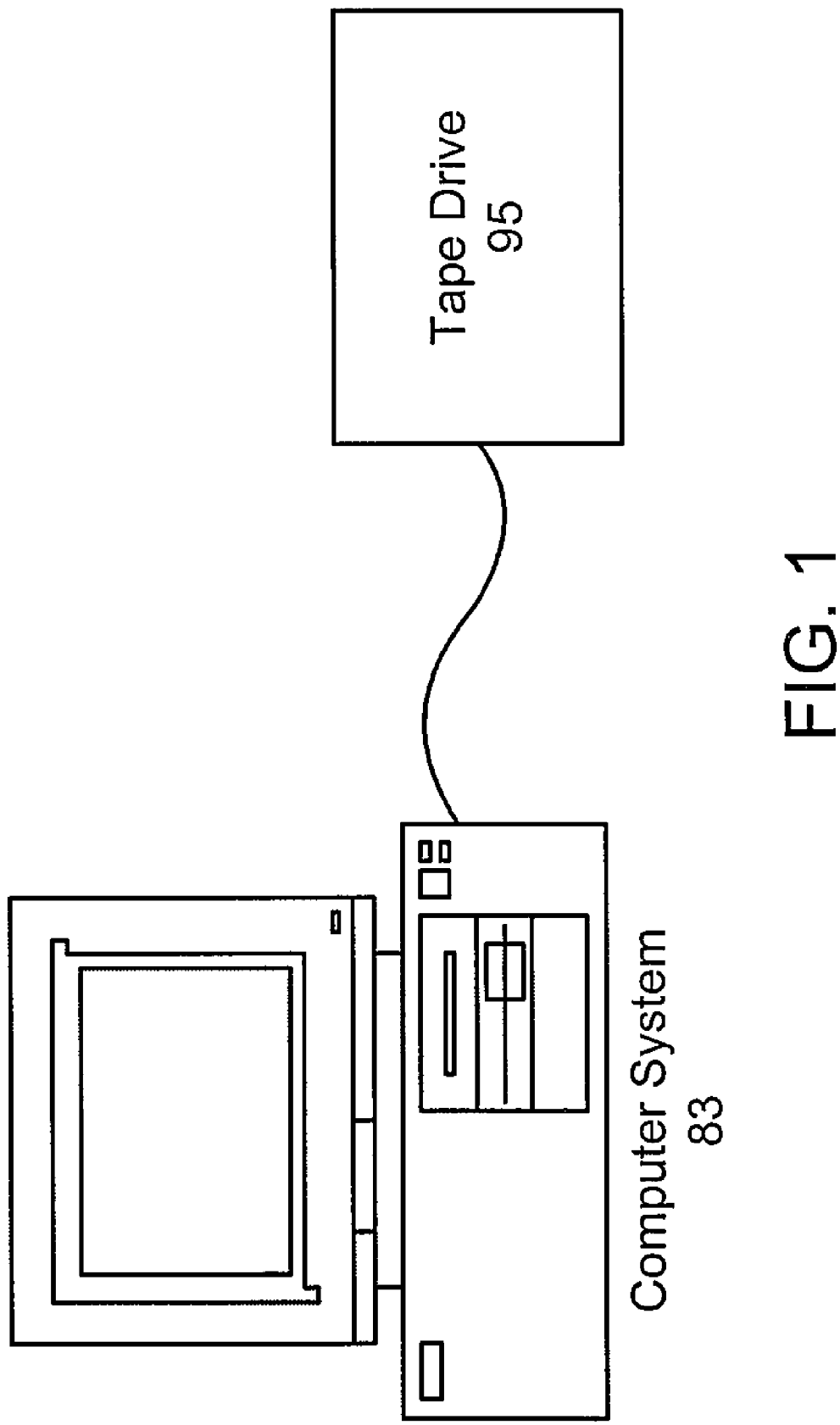
FIG. 1 illustrates a system in which restore software executes to restore a plurality of files to a target volume from a backup image stored on a tape drive.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for restoring files from a backup image to a target volume are described herein. As shown in FIG. 1, the system may include a computer system 83 which includes or is coupled to one or more target storage devices on which the target volume is stored. In this example, the computer system 83 also includes or is coupled to a tape drive 95 on which the backup image is stored. The computer system 83 executes restore software 205 which manages a restore operation to restore a plurality of files from the backup image to the target volume. The restore software 205 may invoke a snapshot of the target volume before restoring the plurality of files to the target volume. If the restore operation fails before all the files are restored to the target volume then the restore software 205 may use the snapshot to return one or more of the files to their original states as they existed before the restore operation was initiated, as described in detail below.

Figure 2:
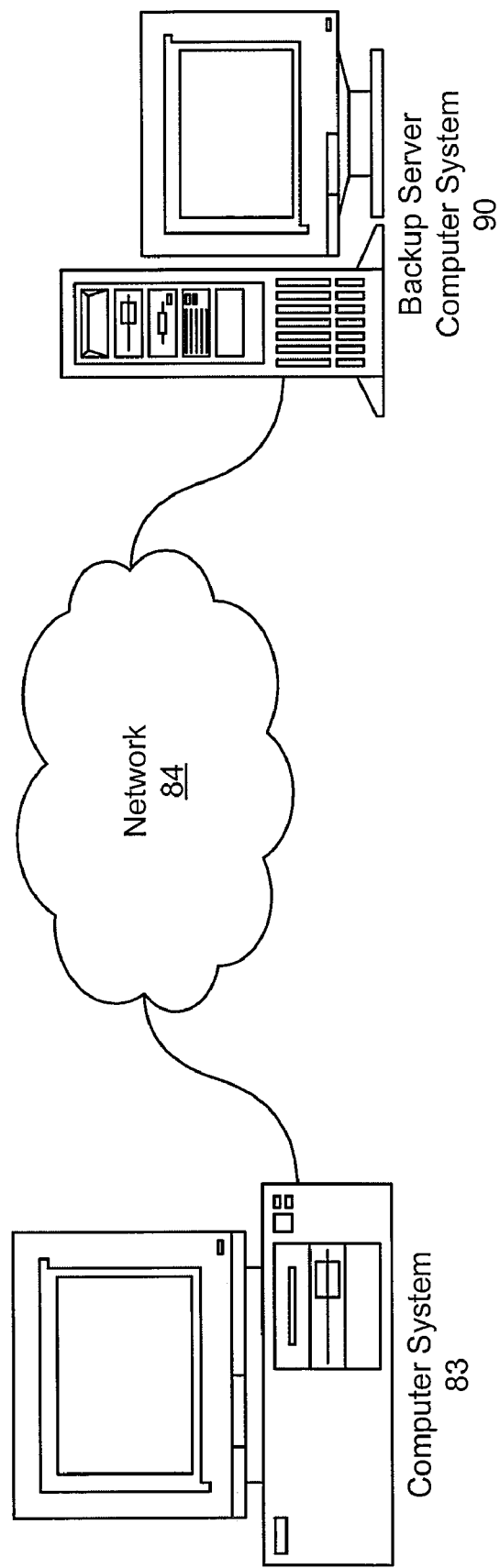
FIG. 2 illustrates a system in which restore software executes to restore a plurality of files to a target volume from a backup image stored on a backup server computer system.

FIG. 2 illustrates another embodiment of the system. In this embodiment the backup image is stored on a backup server computer system 90. The computer system 83 connects through a network 84 to the backup server computer system 90 in order to receive the backup data to be restored to the target volume. In various embodiments, the network 84 may include any type of network or combination of networks. For example, the network 84 may include any type or combination of local area network (LAN), a wide area network (WAN), wireless networks, an Intranet, the Internet, etc. Exemplary local area networks include Ethernet networks, Fiber Distributed Data Interface (FDDI) networks, and token ring networks. Also, the computer system 83 and backup server computer system 90 may each be coupled to the network 84 using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

It is noted that FIG. 1 and FIG. 2 are illustrated as examples only. In various embodiments the backup image may be stored on any type of storage device included in, coupled to, or accessible by the computer system 83. For example, the backup image may be stored on a disk drive, a tape drive, an optical drive, flash memory device, or other storage device included in, coupled to, or accessible by the computer system 83. The backup image may also be distributed across multiple storage devices in some embodiments, e.g., so that part of the backup image is stored on one storage device and part of the backup image is stored on another storage device.

Also, the target volume may be stored on any type of storage device included in, coupled to, or accessible by the computer system 83. In a typical embodiment the target volume is stored on one or more hard disk drives, but the target volume may also be stored on other types of storage devices, such as flash memory devices, optical storage devices, etc.

The target volume corresponds to a partitioning and/or aggregation of physical storage provided by one or more storage devices including, but not limited to, single storage devices (e.g., disk drives), storage systems such as RAID (Redundant Array of Independent Disks) systems, disk arrays, JBODs (Just a Bunch Of Disks, used to refer to disks that are not configured according to RAID), tape devices, and optical storage devices. The target volume may be formed from a portion of the overall storage of a physical device, from the storage of an entire physical device, or from the storage of multiple physical storage devices combined. In some embodiments, the target volume may be managed by a volume manager application. As used herein, the term "volume manager" broadly refers to software that selects and combines storage space from one or more physical storage devices into a logical volume.

As used herein, the term "backup image" refers to data created by backing up files from a computer system. The backup image may be created using various types of backup techniques, such as block-level backups or file-by-file backups. Thus, for example, the backup image may include an exact block-level image of the original volume from which the backup image was created, or each file that is backed up from the original volume may be stored in the backup image as a corresponding file. Also, the backup image may include data for all of the files in the original volume from which the backup image was created or only a subset of the files.

Figure 3:
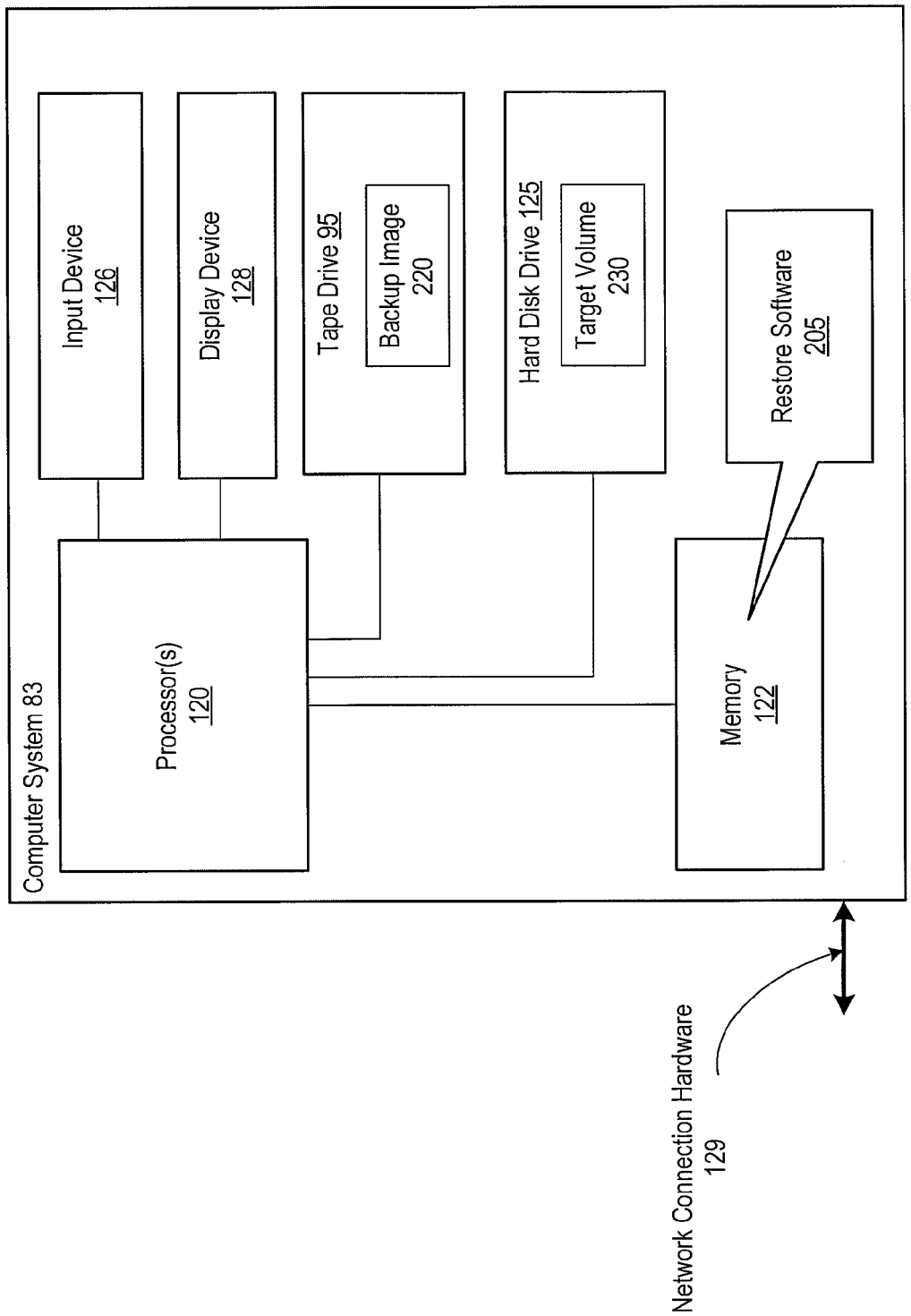
FIG. 3 illustrates the computer system in which the restore software executes.

Referring now to FIG. 3, one embodiment of the computer system 83 is illustrated in greater detail. It is noted that in various embodiments the computer system 83 may be any type of computer system, and FIG. 3 is intended as an example only. In this example, the computer system 83 includes a processor 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the restore software 205. The processor 120 may execute the restore software 205 to implement the method described below. The memory 122 may also store other software which operates in conjunction with or which is used by the restore software 205, such as volume manager software, storage device management software, file system software, and/or operating system software.

In various embodiments the restore software 205 may be implemented in any of various ways and may have any desired software architecture. For example, in some embodiments the restore software 205 may be implemented as a single software application. In other embodiments the restore software 205 may be implemented as two or more software programs or applications that operate in conjunction with each other.

Referring again to FIG. 3, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the computer system 83 may include multiple processors 120.

In the illustrated embodiment, the backup image 220 is stored on a tape drive 95. The backup image 220 includes the backup data for the plurality of files to be restored to the target volume 230. The target volume 230 is stored on a hard disk drive 125. As discussed above, in other embodiments both the backup image 220 and the target volume 230 may be stored on any of various other types of storage devices which are coupled to the computer system 83 in any of various ways. In some embodiments one or both of the backup image 220 and the target volume 230 may be stored on a storage device accessed by the computer system 83 through a network 84.

The computer system 83 may also include one or more input devices 126 for receiving user input from a user of the computer system 83. The input device(s) 126 may include any of various types of input devices, such as keyboards, keypads, microphones, or pointing devices (e.g., a mouse or trackball). The computer system 83 may also include one or more output devices 128 for displaying output to the user. The output device(s) 128 may include any of various types of output devices or display devices, such as LCD screens or monitors, CRT monitors, etc.

The computer system 83 may also include network connection hardware 129 through which the computer system 83 connects to the network 84. The network connection hardware 129 may include any type of hardware for coupling the computer system 83 to the network 84, e.g., depending on the type of network.

Figure 4:
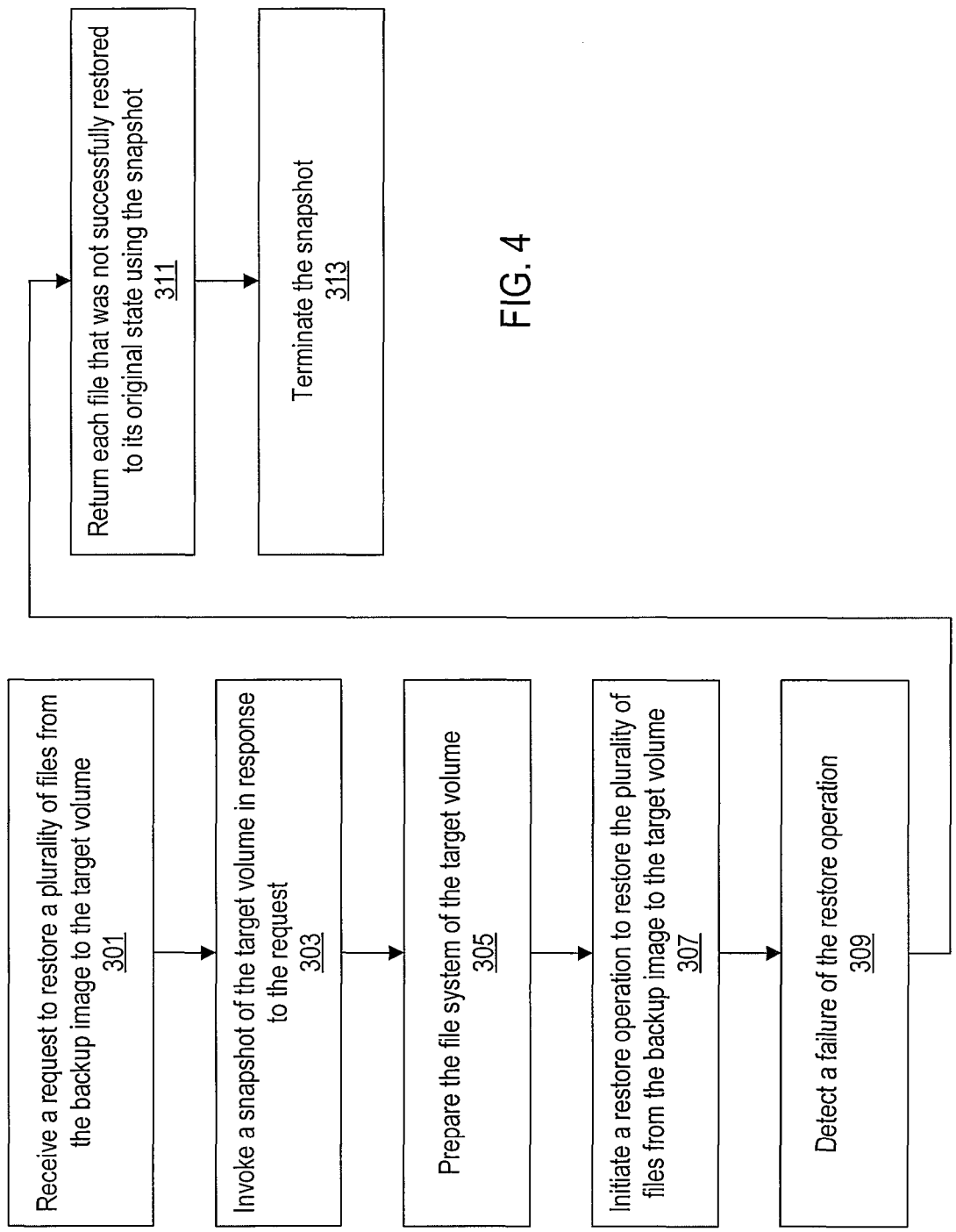

FIG. 4 is a flowchart diagram illustrating one embodiment of a method for preventing files from being corrupted when a restore operation fails. The method may be implemented by the restore software 205 executing on the computer system 83.

As indicated in block 301, the restore software 205 may receive a request to restore a plurality of files from the backup image to the target volume. In some embodiments the restore software 205 may include a graphical user interface that allows a user or administrator of the computer system 83 to select which files to restore from the backup image. Thus, the files which the user desires to restore may be selected through user input to the graphical user interface. In addition to selecting files, in some embodiments the user may also select one or more folders which contain files and/or other folders. If the user selects a folder then all the files and/or nested folders in the selected folder may be selected for restore. The restore software 205 may query a catalog to determine which files and folders are contained in the selected folder so that these items can be restored.

The backup image may have been previously created from the target volume, e.g., in a backup operation. Thus, in some embodiments, each of the plurality of files may exist in both the target volume and the backup image. The version in the target volume is referred to herein as the "original version", and the version in the backup image is referred to as the "backup version". The request to restore the plurality of files to the target volume may thus indicate a request to replace the original versions of the plurality of files with the backup versions.

In other embodiments one or more of the plurality of files may exist in the backup image but not the target volume. For example, the backup image may have been created from a volume other than the target volume, or one or more of the plurality of files may have existed in the target volume when the backup image was created, but were subsequently deleted. In this case, the request to restore the plurality of files may indicate a request to create in the target volume each of the plurality of files that do not yet exist.

As indicated in block 303, the restore software 205 may invoke a snapshot of the target volume in response to the request received in block 301. Invoking the snapshot may establish a point-in-time representation of the target volume, e.g., as it exists at the time the snapshot is invoked. This may enable the selected files to be returned to their original states using the snapshot in the event that a failure occurs during the restore operation, as described below.

In some embodiments, invoking the snapshot may comprise creating a copy-on-write snapshot of the target volume. The copy-on-write snapshot may be created without actually copying the data from the target volume to the snapshot. Instead, the copy-on-write snapshot may be created by simply creating one or more data structures for managing the snapshot or for holding data that will be subsequently copied into the snapshot using traditional copy-on-write techniques when the target volume is written to during the restore operation. This may enable the copy-on-write snapshot to be created quickly. The copy-on-write snapshot may be created on the same storage device on which the target volume is stored or on a different storage device.

In other embodiments the snapshot may be invoked as a hardware-provided snapshot. For example, the restore software 205 may request a device driver or other device management software that manages the storage device(s) on which the target volume is stored to invoke a snapshot of the target volume. As one example, the target volume may be mirrored to a group of hard disk drives such that every write request to write data to the target volume results in the same data being written to all of the hard disk drives. The snapshot may be invoked by simply removing one of the hard disk drives from the group so that write requests no longer result in data being written to that particular hard disk drive. Thus, the target volume data on that particular hard disk drive remains in the same state as it exists at the time the snapshot is invoked, while write requests continue to update the target volume on the other hard disk drive(s).

In other embodiments the snapshot may be implemented as a redirect-on-write snapshot or may be implemented using various other types of snapshot techniques known in the art.

As indicated in block 305, the restore software 205 may prepare the file system of the target volume for the restore operation. For example, for each respective file of the plurality of files, if the respective file does not yet exist in the target volume then the respective file may be created. For example, an inode or other file system object or metadata that represents the respective file may be created in the file system. For each respective file of the plurality of files that does already exist in the target volume, the file system object(s) or metadata that represent the respective file may be modified, e.g., by truncating the file to zero length.

As indicated in block 307, the restore software 205 may initiate a restore operation to restore the plurality of files from the backup image to the target volume. The restore operation may operate to copy data for the plurality of files from the backup image to the target volume. Although this causes the data in the target volume to be modified, the unmodified data (e.g., the target volume data as it existed before the restore operation began) still remains available through the snapshot. For example, if the snapshot is a copy-on-write snapshot then for each block that is modified in the target volume during the restore operation, the original data for the block may be automatically copied into the copy-on-write snapshot. As another example, if the snapshot is a hardware-provided snapshot then the snapshot already contains a complete copy of the original target volume, and writes to the target volume during the restore operation do not modify the snapshot.

Under normal circumstances the restore operation operates to successfully restore each of the plurality of files to the target volume. In this case, it is not necessary to use the snapshot, and the snapshot may simply be terminated or deleted.

However, in some cases the restore operation may fail before all files of the plurality of files are completely restored to the target volume. For example, the restore operation may fail due to causes such as: a hardware failure of a storage device on which the target volume is stored; a hardware failure of a storage device on which the backup image is stored; corrupted data in the backup image; etc.

If the restore operation fails then one or more of the plurality of files that were being restored may be in a corrupt state. For example, if the backup image is a block-level backup image and if the files were being restored block-by-block from the backup image then any file whose complete data had not yet been restored at the time the restore operation failed may be in a corrupt state. As another example, if the backup files are stored in the backup image on a file basis and if the files were being restored on a file-by-file basis then the file that was being restored at the time the restore operation failed may be in a corrupt state.

As indicated in block 309, the restore software 205 may detect the failure of the restore operation. Each of the plurality of files that was not successfully restored during the restore operation is referred to herein as a failed file. In some embodiments, the restore software 205 may return each failed file to its original state using the snapshot, as indicated in block 311.

The techniques used to return a failed file to its original state may vary depending on the type of snapshot used. For example, if the snapshot is a copy-on-write snapshot then the copy-on-write snapshot may include a map table or other data structure which specifies which blocks of the target volume were modified during the restore operation. For each block in the target volume that corresponds to one of the failed files, the original data of the block may be copied from the copy-on-write snapshot back to the target volume. This effectively rolls back each failed file to its original version in the target volume while still allowing the successfully restored files to remain in their restored states.

If the snapshot is a hardware-provided snapshot then each failed file may be copied from the snapshot to the target volume. Again, this effectively rolls back each failed file to its original version in the target volume while still allowing the successfully restored files to remain in their restored states. If a failed file did not previously exist in the target volume then it may simply be deleted, e.g., the file system object(s) representing the file may be deleted from the target volume.

As indicated in block 313, after the failed files have been returned to their original states, the restore software 205 may terminate the snapshot. For example, if the snapshot is a copy-on-write snapshot then the copy-on-write behavior may be terminated, and the data structures representing the snapshot may be deleted. If the snapshot is a hardware-provided snapshot then the data on the particular disk drive or other storage device on which the snapshot is stored may be synchronized with the updated target volume data, and the particular disk drive may be re-added to the group of storage devices to which the target volume is mirrored. Subsequent write operations to the target volume may then update the particular disk drive as well as the other disk drives in the group.

As discussed above, in some cases the restore operation may successfully restore a first subset of the plurality of files from the backup image to the volume and may not successfully restore a second subset of the plurality of files from the backup image to the volume. In the embodiment of the method discussed above with reference to FIG. 4, each file of the second subset of the plurality of files is returned to its original state in the volume using the snapshot, but no file from the first subset of the plurality of files is returned to its original state. This allows the successfully restored files to remain in their restored states, while preventing the unsuccessfully restored files from being in a corrupted state.

However, in some applications, if some of the plurality of files are in their original states and others are in their restored states then the files may not be consistent with each other, which may lead to problems. Thus, in some embodiments it may be desirable to use the snapshot to return all of the plurality of files to their original states, even if some of them were successfully restored. For example, FIG. 5 illustrates an embodiment of the method which operates similarly as described above with reference to the method of FIG. 4, but block 311 has been replaced by block 312, which operates to return each file of the plurality of files to its original state using the snapshot. Thus, in the method of FIG. 5, each of the plurality of files is effectively returned to the same state as it was in when the snapshot was created.

In some embodiments the restore software 205 may allow the user to select whether to roll back all the files as in the method of FIG. 5 or to only roll back those files that were not successfully restored. For example, a graphical user interface of the restore software 205 may allow the user to set preferences specifying which behavior to perform in the event of a failed restore operation, or the user may be prompted to make a decision at the time of failure. Also, in some embodiments, after a failure occurs the restore software 205 may present the user with lists of files that were successfully and unsuccessfully restored and may allow the user to select which of the files to roll back to their original states, if any.

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-accessible storage medium storing program instructions executable to:
receive user input selecting a plurality of files in a backup image and requesting to restore the plurality of files from the backup image to a volume, wherein each of the plurality of files has an original version in the volume and a backup version in the backup image;
create a snapshot of the volume in response to the restore request, wherein the snapshot represents the volume at a point in time after the restore request was received and before initiating a restore operation to attempt to satisfy the restore request;
after creating the snapshot of the volume, initiate the restore operation to attempt to satisfy the restore request by attempting to restore the backup versions of the plurality of files from the backup image to the volume by replacing the original versions in the volume with the backup versions in the backup image;
detect a failure of the restore operation, wherein the restore operation successfully restores the backup version for each file of a first subset of the plurality of files from the backup image to the volume and fails to successfully restore the backup version for each file of a second subset of the plurality of files from the backup image to the volume;
prompt for user input selecting to perform one of the following two options in response to the failure of the restore operation: 1) returning each file of both the first subset and the second subset to its original version in the volume; or 2) returning each file of only the second subset to its original version in the volume;
wherein in response to receiving user input selecting the first option, the program instructions are executable to use the snapshot to return each file of both the first subset and the second subset to its original version in the volume; and
wherein in response to receiving user input selecting the second option, the program instructions are executable to use the snapshot to return each file of the second subset to its original version in the volume while leaving each file of the first subset as its backup version in the volume.

2. The computer-accessible storage medium of claim 1, wherein the program instructions are executable to create the snapshot of the volume by invoking a copy-on-write snapshot of the volume.

3. The computer-accessible storage medium of claim 1, wherein the program instructions are executable to create the snapshot of the volume by invoking a hardware-provided snapshot of the volume.

4. The computer-accessible storage medium of claim 1, wherein the volume is mirrored on a plurality of storage devices;
wherein the program instructions are executable to create the snapshot of the volume by halting the volume from being mirrored on a first storage device of the plurality of storage devices so that the first storage device retains data of the volume as it exists before the restore operation is initiated, wherein the program instructions are executable to use the first storage device as the snapshot.

5. The computer-accessible storage medium of claim 1, wherein the program instructions are further executable to:
terminate the snapshot after returning one or more files to their original versions.

6. A system comprising:
one or more processors; and
memory storing program instructions;
wherein the program instructions are executable by the one or more processors to:
receive user input selecting a plurality of files in a backup image and requesting to restore the plurality of files from the backup image to a volume, wherein each of the plurality of files has an original version in the volume and a backup version in the backup image;
create a snapshot of the volume in response to the restore request, wherein the snapshot represents the volume at a point in time after the restore request was received and before initiating a restore operation to attempt to satisfy the restore request;
after creating the snapshot of the volume, initiate the restore operation to attempt to satisfy the restore request by attempting to restore the backup versions of the plurality of files from the backup image to the volume by replacing the original versions in the volume with the backup versions in the backup image;
detect a failure of the restore operation, wherein the restore operation successfully restores the backup version for each file of a first subset of the plurality of files from the backup image to the volume and fails to successfully restore the backup version for each file of a second subset of the plurality of files from the backup image to the volume;
prompt for user input selecting to perform one of the following two options in response to the failure of the restore operation: 1) returning each file of both the first subset and the second subset to its original version in the volume; or 2) returning each file of only the second subset to its original version in the volume;
wherein in response to receiving user input selecting the first option, the program instructions are executable by the one or more processors to use the snapshot to return each file of both the first subset and the second subset to its original version in the volume; and
wherein in response to receiving user input selecting the second option, the program instructions are executable by the one or more processors to use the snapshot to return each file of the second subset to its original version in the volume while leaving each file of the first subset as its backup version in the volume.

7. The system of claim 6, wherein the program instructions are further executable by the one or more processors to:
terminate the snapshot after returning one or more files to their original versions.

8. A computer-implemented method comprising:
a computer system receiving user input selecting a plurality of files in a backup image and requesting to restore the plurality of files from the backup image to a volume, wherein each of the plurality of files has an original version in the volume and a backup version in the backup image;
the computer system creating a snapshot of the volume in response to the restore request, wherein the snapshot represents the volume at a point in time after the restore request was received and before initiating a restore operation to attempt to satisfy the restore request;
after creating the snapshot of the volume, the computer system initiating the restore operation to attempt to satisfy the restore request by attempting to restore the backup versions of the plurality of files from the backup image to the volume by replacing the original versions in the volume with the backup versions in the backup image;
the computer system detecting a failure of the restore operation, wherein the restore operation successfully restores the backup version for each file of a first subset of the plurality of files from the backup image to the volume and fails to successfully restore the backup version for each file of a second subset of the plurality of files from the backup image to the volume;

the computer system prompting for user input selecting to perform one of the following two options in response to the failure of the restore operation: 1) returning each file of both the first subset and the second subset to its original version in the volume; or 2) returning each file of only the second subset to its original version in the volume;

wherein the method further comprises:

using the snapshot to return each file of both the first subset and the second subset to its original version in the volume if user input selecting the first option is received;

using the snapshot to return each file of the second subset to its original version in the volume while leaving each file of the first subset as its backup version in the volume if user input selecting the second option is received.

9. The method of claim 8, further comprising:

terminating the snapshot after returning one or more files to their original versions.

* * * * *